United States Patent
Nigoghosian

[11] Patent Number: 5,842,670
[45] Date of Patent: Dec. 1, 1998

[54] HAIR DRYER SUPPORT

[76] Inventor: Gregory H. Nigoghosian, 21917 Michigan Ave., Dearborn, Mich. 48124

[21] Appl. No.: 874,417

[22] Filed: Jun. 13, 1997

Related U.S. Application Data

[60] Provisional application No. 60/020,474 Jun. 13, 1996.

[51] Int. Cl.⁶ .................................................. F16M 13/00
[52] U.S. Cl. ............................... 248/160; 34/90; 248/910
[58] Field of Search .................................. 248/160, 910; 34/90, 96, 97, 104

[56] References Cited

U.S. PATENT DOCUMENTS

| | | |
|---|---|---|
| D. 287,203 | 12/1986 | Jenkins et al. . |
| D. 314,502 | 2/1991 | Weldin . |
| D. 329,507 | 9/1992 | Assmann . |
| D. 343,024 | 1/1994 | Blaisdell . |
| 599,543 | 2/1898 | Whitaker .................. 248/160 |
| 2,481,271 | 9/1949 | Willey .................. 248/160 X |
| 2,510,198 | 6/1950 | Tesmer .................. 248/160 X |
| 4,225,106 | 9/1980 | Eplan . |
| 4,278,223 | 7/1981 | Fauteux . |
| 4,320,283 | 3/1982 | Voigt . |
| 4,323,212 | 4/1982 | Macaulay . |
| 4,466,203 | 8/1984 | Thomas . |
| 4,617,743 | 10/1986 | Barnard . |
| 4,673,148 | 6/1987 | Oliver . |
| 4,696,447 | 9/1987 | Strecker . |
| 4,712,213 | 12/1987 | Gettleman . |
| 4,746,090 | 5/1988 | Hamilton . |
| 4,842,174 | 6/1989 | Sheppard et al. . |
| 4,874,142 | 10/1989 | Gelatt . |
| 4,910,385 | 3/1990 | Shye-Long . |
| 5,064,154 | 11/1991 | Payne . |
| 5,135,189 | 8/1992 | Ghazizadeh . |
| 5,172,880 | 12/1992 | McDougall . |
| 5,174,531 | 12/1992 | Perakis . |
| 5,279,048 | 1/1994 | Lawall et al. . |
| 5,284,130 | 2/1994 | Ratliff . |
| 5,592,749 | 1/1997 | Trimmer .................. 248/160 X |

FOREIGN PATENT DOCUMENTS

| | | | |
|---|---|---|---|
| 854100 | 10/1952 | Germany ................. 248/160 |
| 595995 | 3/1947 | United Kingdom ........... 248/910 X |

Primary Examiner—Ramon O. Ramirez
Attorney, Agent, or Firm—Harness, Dickey & Pierce, PLC

[57] ABSTRACT

As apparatus for supporting an electrical hair dryer or other electrical implement having an elongated portion. The apparatus includes a base from which projects a flexible tube. At the other end of the flexible tube a hair dryer holder is arranged to receive a hair dryer. When the hair dryer is inserted into the holder, the flexible tube may be positioned into any of a number of various orientations. This provides the user with enhanced operability of the stand, because the user may arrange the flexible tube in a variety of positions.

9 Claims, 2 Drawing Sheets

HAIR DRYER SUPPORT

This application claims the benefit of U.S. Provisional Application No. 60/020,474, Filed Jun. 13, 1996.

BACKGROUND OF THE INVENTION

1. Technical Field

This invention relates generally a support for a hair dryer, and more particularly, to a self-supporting hair dryer stand with a flexible tubing which provides an infinite number of positions for directing the hair dryer in the desired fashion.

2. Discussion

Conventional hand held hair dryers for use in the home and beauty salons typically assume the shape of a gun. The hair dryer includes a handle to be held by the operator in one hand and a fan and a heating element which directs air out of a barrel portion of the hair dryer. In order to use the conventional hair dryers, the operator must use one hand to hold the hair dryer and only has one hand free to style the hair using a brush, comb, or their hand. At times, the operator may desire to have both hands available to shape and style the hair while the hair dryer is simultaneously directed to provide warm air onto the hair.

The present prior art does provide some approaches for operating the hair dryer in a hands-free mode through the use of hair dryer stands. Many of these stands are fraught with inconvenience. For example, some hair dryer stands require hair dryers specifically adapted for attachment to or insertion in the stand. Other stands in the prior art must be specifically fastened to a wall, a door, or are not otherwise portable. Further yet, other stands have a rather large base which sits upon the floor from which projects a rather large, bulky hair dryer support. The floor stands are particularly large and inconvenient, and are not easily stored out of view when not in use. In addition, many stands have limited range of motion and do not offer a variety of orientations. Thus, there is a need for a hair dryer stand which is portable, small, and which enables substantial variation in the orientation of the hair dryer.

OBJECTS OF THE INVENTION

Therefore, it is an object of the present invention to provide a hair dryer stand having a holder which is adaptable to hair dryers of various shapes and sizes.

It is a further object of this invention to provide a relatively small, portable hair dryer stand having a moderately-sized base which may be set upon a counter-top or a shelf.

It is a further object of this invention to provide a hair dryer stand having a flexible tube so that the hair dryer may be oriented in any of a number of positions as desired by the user.

It is yet a further object of the present invention to provide a hair dryer stand in which flexible tubing attaches to and extends from a base at one end and connects to a holder at the other end, and the flexible tubing may be positioned in an infinite number of positions as required by the operator.

SUMMARY OF THE INVENTION

The improved hair dryer and holder assembly of the present invention satisfies all of the foregoing needs. The hair dryer stand includes a base from which projects a flexible tubing. The flexible tubing includes a connector at one end having threads which engage corresponding threads found in a bore of the base. The flexible tubing extends from the base and, at the opposite end, includes a second connector having a threaded portion. The treads of the second connector engage corresponding threads of an adaptor of a holder or ring which receives the hair dryer. The flexible tubing may be made of a metal material and may be covered by an outer flexible sheath which provides a decorative touch to the hair dryer stand.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
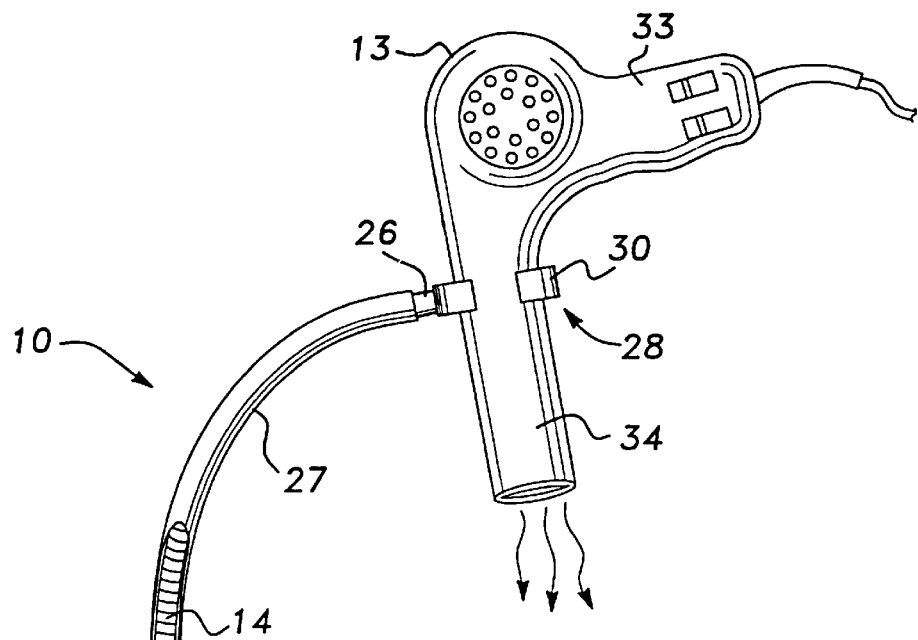
FIG. 1 is a side elevational view of the assembled hair dryer stand arranged in accordance with the principles of the present invention.

Referring to FIGS. 1–4, the assembled hair dryer stand 10 is arranged in accordance with the principles of the present invention is shown. The stand includes a base 12 which provides support for the stand and is preferably of a weight sufficient to counterbalance the weight of the hair dryer 13 to be attached to the stand. The stand may be formed of a ceramic, marble, plastic, or any material which provides sufficient weight and may be adapted to receive the flexible tubing. The base also preferably has a finished appearance to provide a more attractive product in the home or salon of the user. A flexible tubing 14 extends from the base 12. The flexible tubing 14 includes at one end a connector 16 which may be crimped or otherwise fastened to the flexible tubing 14. The connector 16 includes a threaded portion 18 which engages corresponding threads 20 formed on the base 12.

At the other end of the flexible tubing, a second connector 22 is crimped or otherwise fastened to the second end of the flexible tubing 14. The second connector 22 also includes a threaded portion 24 which engages the threads (not shown) of an adapter 26 which interconnects the hair dryer holder or ring 28 to the second end of the flexible tubing 14. A sheath or outer tubing 27 may optionally cover the flexible tube 14 to provide an enhanced decorative appearance.

Figure 2:
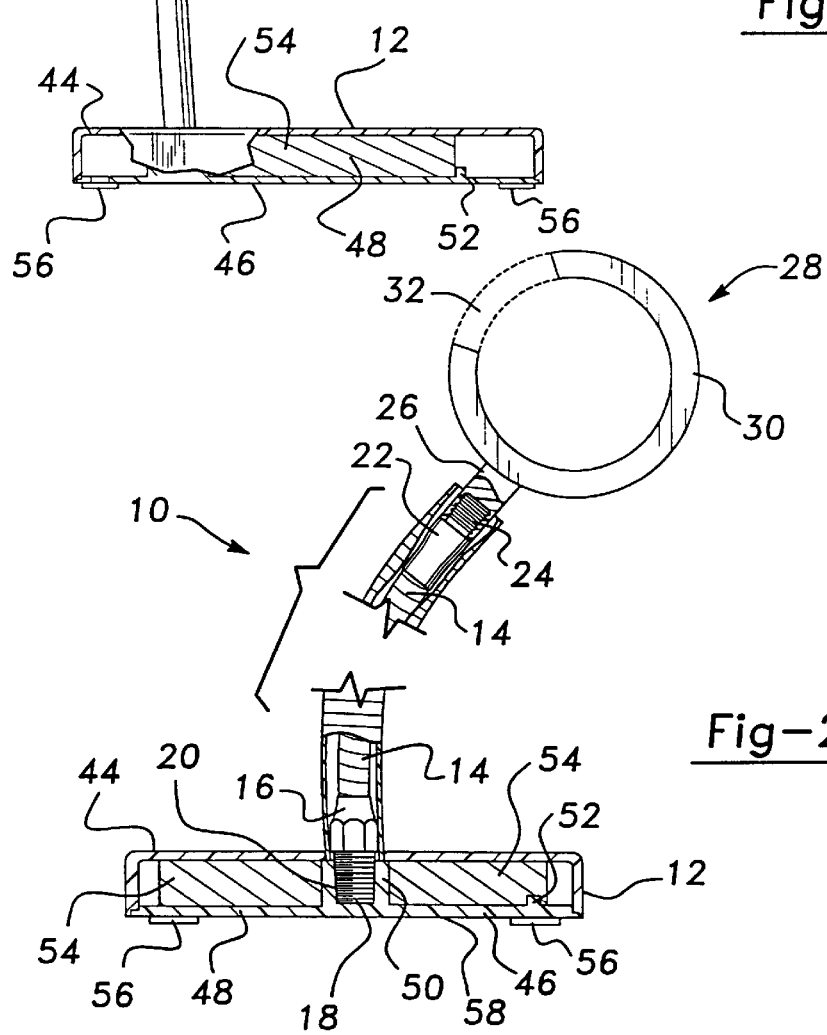
FIG. 2 is a side elevational view of the flexible tubing, including the threaded connectors at each end.
Figure 3:
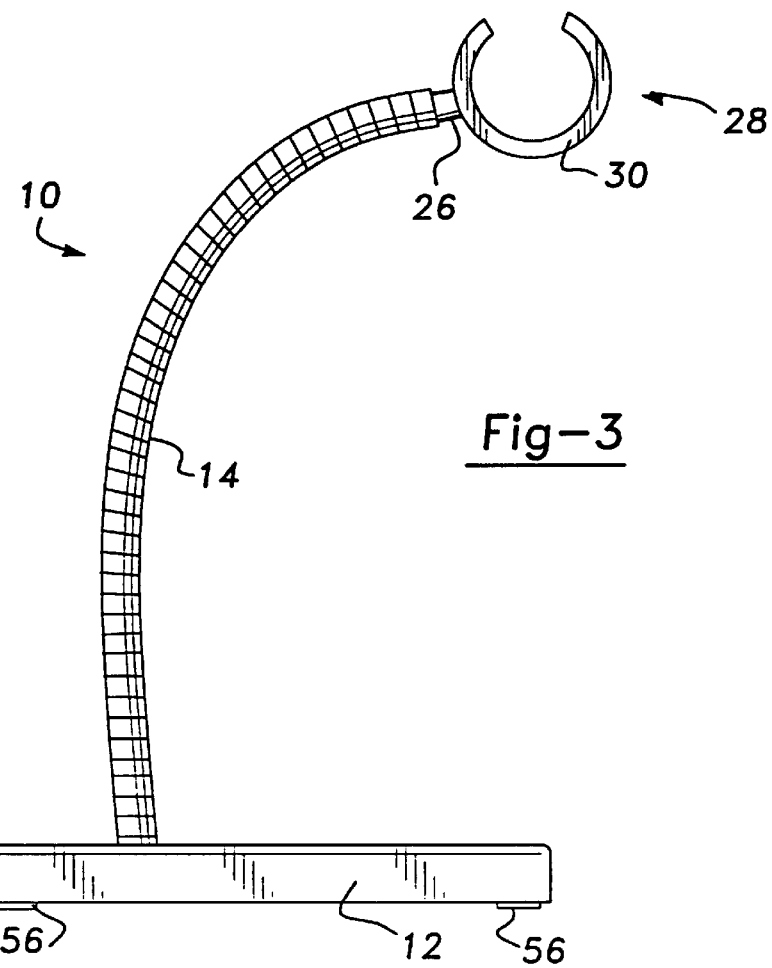
FIG. 3 is a side elevational view of the holder portion of the hair dryer stand as attached to the flexible tubing and base.
Figure 4:
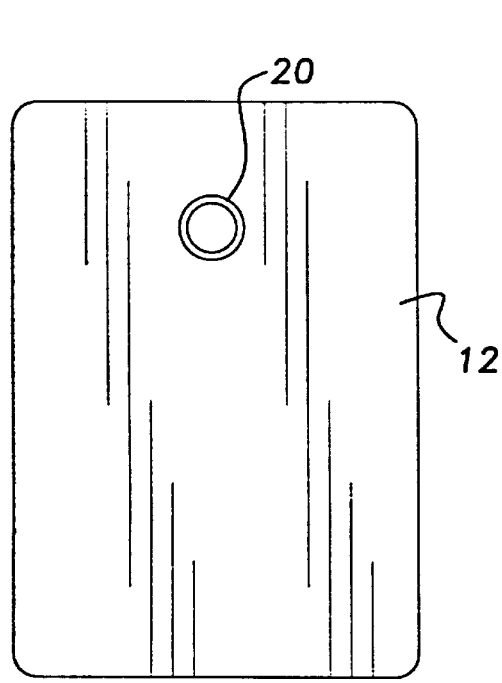
FIG. 4 is a top view of the base, including the threaded portion which receives the corresponding threaded portion of the flexible tubing connector.

The holder 28 includes a generally cylindrically shaped ring 30 having a section 32 cut out, which is shown in phantom in FIG. 2. The ring 30 receives the hair dryer barrel 34 or handle 33, as the case may be, to secure the hair dryer 13 to the stand. One advantage of the holder 28 is that the ring 30 is adaptable to any of a number of hair dryer barrels of varying size and shape. The holder 28 may be formed of a flexible plastic material into which may be inserted the barrel 34 of the hair dryer 36 so that the ring provides an interference fit to maintain the barrel 34 in position. Further, the cut out section 32 of the holder 28 enables greater flexibility of the ring 30 and also accommodates elliptically shaped, rather than cylindrically shaped, barrels.

In a preferred embodiment of the present invention, base assembly 12 of hair dry stand 10 comprising a two-piece assembly including a decorative outer layer 44 and a supporting inner layer 46. Outer layer 44 forms a shell preferably having a pleasing appearance. Inner layer 46 forms a supporting substrate for outer layer 44 and forms a primary support for flexible tubing 14 and attached hair dryer 13. Outer layer 44 and inner layer 46 preferably have complementary shapes which enable a press fit connection and a positive locking mechanism. Further outer layer 44 and inner layer 46 are formed using plastic in an injection molding operation.

Inner layer 46 comprises a bottom plate 48 from which projects a boss 50 having threads 20 which receive threaded portion 18 of connector 16. Threaded interconnection of connector 16 and boss 50 also assists in maintaining engagement between outer layer 44 and inner layer 46. Inner layer 46 also includes bumpers 52 which project upwardly from bottom plate 48. Bumpers 52 maintain placement of plate 54. Plate 54 adds weight to base assembly 12, to provide added stability and support to the hair dryer stand 10 when in operation. Plate 54 may be any of a given material such as lead, steel, or any other material having sufficient weight. Bottom feet 56 are attached to the bottom surface 58 of bottom plate 48 using an adhesive. Bottom feet 52 provide a non-slip surface to prevent hair dryer stand 10 from slipping or sliding when in operation.

Figure 5:
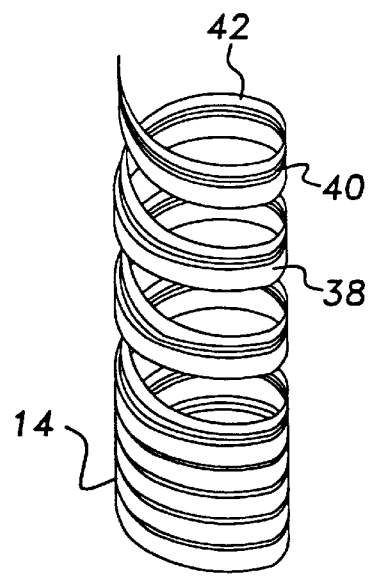
FIG. 5 shows the configuration of the flexible tubing.

Referring to FIG. 5, FIG. 5 shows the construction of the flexible tubing 14. The flexible tubing 14 is generally comprised of a long, thin ribbon 38 formed with a metallic material. The ribbon 38 is formed with a groove 40 and a lip 42. When the ribbon 38 is wound, the groove 40 and lip 42 cooperate to form the wound flexible tube 14. One skilled in the art will recognize this construction as armored cable or the like. One skilled in the art will further recognize that any flexible tubing providing a combination of the desired strength and flexibility will work equally well. The flexible tubing 14 may be formed of any of a number of metallic or other materials such as steel, aluminum, copper, and the like.

From the foregoing, it can be seen that the hair dryer stand of the present invention provides a novel arrangement for supporting a hair dryer. The base provides a stable foundation from which the flexible tubing projects. The flexible tubing may be positioned in any of a number of orientations to meet the needs of the user. At the other end of the flexible tubing, the holder cooperates with any of a number of variously sized and shaped hair dryers to adaptably receive the same so that the hair dryer stand may be used with any of a number of hair dryers.

Although the invention has been described with particular reference to certain preferred embodiments thereof, variations and modifications can be effected within the spirit and scope of the following claims.

What is claimed is:

1. A hair dryer stand comprising:
    a support base having an outer layer and an inner layer interconnected to the outer layer, the inner layer providing a foundation on which the outer layer is disposed, the inner layer including a bottom plate and a boss projecting from the bottom plate, the support base further comprising a plate inserted between the outer layer and the inner layer and at least one bumper projecting from the bottom plate and engaging the plate to prevent movement of the plate;
    a flexible tubing attached at one end to and extending from the boss of the support base; and
    a hair dryer holder attached to the other end of the flexible tubing; the hair dryer holder being formed of an open cylindrical ring and receiving hair dryers or various shapes and sizes,
    wherein the flexible tubing may be positioned to provide a plurality of orientation for the hair dryer.

2. The hair dryer stand of claim 1 further comprising an outer tubing formed around the flexible tubing, the outer tubing being flexible to move in accordance with the flexible tubing.

3. The hair dryer stand of claim 1 further comprising:
    a first threaded connector on the first end of the flexible tubing for interconnecting the flexible tubing to the support base; and
    a second threaded connector on the second end of the flexible tubing for interconnecting the flexible tubing to the hair dryer holder.

4. The hair dryer stand of claim 3 wherein the support base is formed of one of the group of marble, plastic, metal, and stone, and the support base has a threaded bore to receive the first threaded connector.

5. The hair dryer stand of claim 1 further comprising a first threaded connector on the first end of the flexible tubing for interconnecting the flexible tubing to the support base, the boss having a threaded bore for threadably engaging the threaded connector.

6. The hair dryer stand of claim 5 further comprising a second threaded connector on a second end of the flexible tubing for interconnecting the flexible tubing to the hair dryer holder.

7. The hair dryer stand of claim 1 wherein the plate inserted between the outer layer and the inner layer adds weight in order to stabilize the base.

8. A hair dryer stand comprising:
    a support base comprising an outer layer and an inner layer interconnected to the outer layer, the inner layer providing a foundation on which the outer layer is disposed, the inner layer of the support base including a bottom plate and a boss projecting from the bottom plate, the support base further comprising a plate inserted between the outer layer and the inner layer and at least one bumper projecting from the bottom plate and engaging the plate to prevent movement of the plate;
    a flexible tubing attached at one end to and extending from the boss of the support base, the flexible tubing comprising a first threaded connector on a first end of the flexible tubing for interconnecting the flexible tubing to the support base and a second threaded connector on a second end of the flexible tubing; and
    a hair dryer holder threadably attached to the second end of the flexible tubing, the hair dryer holder being formed of an open cylindrical ring and receiving hair dryers of various shapes and sizes;
    wherein the flexible tubing may be positioned to provide a plurality of orientations for the hair dryer.

9. The hair dryer stand of claim 11 wherein the plate inserted between the outer layer and the inner layer adds weight in order to stabilize the base.

\* \* \* \* \*

UNITED STATES PATENT AND TRADEMARK OFFICE
CERTIFICATE OF CORRECTION

PATENT NO. : 5,842,670
DATED : December 1, 1998
INVENTOR(S) : Gregory H. Nigoghosian It is certified that error appears in the above-identified patent and that said Letters Patent is hereby corrected as shown below:

On the title page, under [56]Agent, Attorney, or Firm, "Dicky" should be --Dickey--

Col. 1, line 4, delete "Filed" and substitute --filed-- therefor

Col. 1, line 9, after "generally" insert --to--

Col. 2, line 3, delete "treads" and substitute --threads-- therefor

Col. 3, line 2, delete "dry" and substitute --dryer-- therefor

Col. 4, line 5, claim 1, delete "or" and substitute --of-- therefor

Col. 4, line 61, claim 9, "claim 11" should be --claim 8--

Signed and Sealed this

Twentieth Day of July, 1999

Attest:

Attesting Officer

Q. TODD DICKINSON

Acting Commissioner of Patents and Trademarks